US009014083B2

(12) United States Patent
Boltz et al.

(10) Patent No.: US 9,014,083 B2
(45) Date of Patent: Apr. 21, 2015

(54) TRANSPORT CHANNEL FLEXIBILITY OVER SATELLITE BACKHAUL LINKS

(75) Inventors: David Boltz, Garland, TX (US); Bo Sundstedt, McKinney, TX (US); Richard Swardh, Frisco, TX (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 454 days.

(21) Appl. No.: 13/246,302

(22) Filed: Sep. 27, 2011

(65) Prior Publication Data
US 2013/0077562 A1 Mar. 28, 2013

(51) Int. Cl.
H04B 7/185 (2006.01)
H04L 12/729 (2013.01)
H04W 40/02 (2009.01)

(52) U.S. Cl.
CPC ........... *H04B 7/18534* (2013.01); *H04W 40/02* (2013.01); *H04B 7/1856* (2013.01)

(58) Field of Classification Search
USPC ......... 370/237, 238, 252, 316, 319, 328, 338, 370/341
See application file for complete search history.

(56) References Cited

U.S. PATENT DOCUMENTS

| 6,366,761 | B1* | 4/2002 | Montpetit ..................... 455/12.1 |
| 7,936,707 | B2* | 5/2011 | Kota et al. ..................... 370/316 |
| 7,944,872 | B2* | 5/2011 | Kimmich et al. ............. 370/316 |
| 8,149,716 | B2* | 4/2012 | Ramanathan et al. ........ 370/238 |
| 8,180,275 | B2* | 5/2012 | Eastman et al. ............. 455/3.02 |
| 8,233,425 | B2* | 7/2012 | Lynch et al. .................. 370/316 |
| 8,359,026 | B2* | 1/2013 | de La Chapelle et al. .... 455/431 |
| 8,553,561 | B1* | 10/2013 | Chokshi et al. ............... 370/238 |
| 2003/0045231 | A1 | 3/2003 | De La Chapelle et al. |
| 2003/0202533 | A1* | 10/2003 | Taylor ........................... 370/468 |
| 2005/0090275 | A1* | 4/2005 | Wang ............................ 455/512 |
| 2009/0109895 | A1* | 4/2009 | Kota et al. ..................... 370/316 |
| 2010/0056181 | A1* | 3/2010 | Rippon et al. ............. 455/456.3 |
| 2012/0307720 | A1 | 12/2012 | Madsen et al. |
| 2012/0327847 | A1* | 12/2012 | Rundquist et al. ............ 370/316 |

* cited by examiner

*Primary Examiner* — Candal Elpenord (57) ABSTRACT

A method is performed in a system integration unit located on the vessel and coupled with a radio device and a plurality of satellite transceivers that each provide a transport route for communication. A method for routing data packets from vessel to a fixed communication center through to one of the transport routes. The method determines which transport route should be used to communicate the data packet based on the availability of all transport routes and the desirability of using each transport route for the transmission of the data packet. The method then routes the data packet to the most desirable transport route that is available for communication data packets.

22 Claims, 5 Drawing Sheets

TRANSPORT CHANNEL FLEXIBILITY OVER SATELLITE BACKHAUL LINKS

FIELD

Embodiments of the invention relate to the field of fleet satellite communication; and more specifically, to the transport channel flexibility in fleet satellite communication.

BACKGROUND

Transport vessels and cruise liners communicate to land based communication systems via satellite links, i.e. satellite transport channels. Satellite technologies consist of L-band satellite communication such as Inmarsat's Fleet Broad Band ("FBB") and VSAT satellite communication utilizing either Ku-band or Ka-band frequencies.

Traditional VSAT solutions offer large data pipes, however, global coverage is not provided for either Ku-band or Ka-band frequencies. Furthermore, both band technologies are prone to outages caused by weather and/or signal blockage.

L-band solutions (FBB) provide near global coverage and are less prone to outages. However, these solutions offer a narrow band connection which provides limited data capabilities.

SUMMARY

Embodiments of the invention include a method for routing data packets from vessel to a fixed communication center through to a transport route. The method is performed in a system integration unit located on the vessel and coupled with a radio device and a plurality of satellite transceivers that each provide a transport route for communication. The system integration unit receives a data packet from the radio device and determines the amount of bandwidth required for effective transport of the data packet. The system integration unit identifies a set of one or more transport routes that are provided by one of the plurality of satellite transceivers. The system integration unit generates a set of one or more ranked transport routes from the set of one or more transport routes according to a desirability of using each transport route for the transport of the data packet. At least one criteria used during the ranking is a comparison between the amount of bandwidth required for the effective transport of the data packet and an amount of bandwidth provided by each of the transport routes. The system integration performs the following steps on the set of one or more ranked transport routes in the order of ranking of those transport routes. The system integration unit determines whether the transport route is available to transport the data packet and routes the data packet to the transport route when it is determined that the transport route is available. Further, the system integration unit drops the data packet when the data packet was not routed to one of the set of one or more ranked transport routes.

Embodiments of the invention include a method for configuring a communication system on vessel communicating with a fixed communication center through one or more transport routes. The method performed in a system integration unit located on the vessel and coupled with a radio device and a plurality of satellite transceivers that each provide a transport route for communication. The system integration unit identifies a set of one or more transport routes, wherein each transport route is provided by one of the plurality of satellite transceivers. The system integration unit performs the following steps on the set of one or more transport routes. The system integration unit determines a transport route availability of the transport route, and adapts the communication system capabilities and configuration based on the transport route availability.

Embodiments of the invention include a system integration unit to operate in a vessel communication system. The system integration unit is to be coupled to a radio device, a radio base station, a router, and a plurality satellite transceivers that each provide a transport route, the system integration unit configured to manage the vessel communication system. The system integration unit comprises a plurality of ports, a transport availability module, and a packet routing module. The plurality of ports are to be coupled to with the radio base station and the plurality of satellite transceivers. The transport availability module configured to determine whether each of a plurality of transport routes is available to transport a data packet, wherein each transport route is provided by one of the plurality of satellite transceivers. The packet routing module is to be coupled with the transport route availability module. The packet routing module receives a data packet from the radio device and determines an amount of bandwidth required for effective transport of the data packet. The packet routing module further identifies a set of available one or more transport routes and generates a set of one or more ranked transport routes from the set of one or more available transport routes according to a desirability of using each transport route for the transport of the data packet. At least one criteria used during the ranking is a comparison between the amount of bandwidth required for the effective transport of the data packet and an amount of bandwidth provided by each of the transport routes. The packet routing module performs the following steps on the set of one or more ranked transport routes in the order of ranking of those transport routes. The packet routing module determines the transport route's availability from the transport route availability module and routes the data packet to the transport route when it is determined that the transport route is available. The packet routing module drops the data packet when the data packet was not routed to one of the set of one or more ranked transport routes.

Embodiments of the invention include a base station controller to operate in a fixed-site communication center. The base station controller is to be coupled with a plurality satellite transceivers that each provide a transport routes to a vessel comprising a radio device, a radio base station, a router, and a system integration unit configured to manage the vessel's communication system, The base station controller comprising a plurality of ports to be coupled with the plurality of satellite transceivers, a transport availability module, and communication system configuration module. The transport availability module is configured to determine whether each of a plurality of transport routes is available for transport of data packets, wherein each transport route is provided by one of the plurality of satellite transceivers. The communication system configuration module identifies a set of one or more transport routes and performs the following steps on the set of one or more transport routes, wherein the transport route being processed is a transport route. The communication system configuration module determine the transport route's availability from the transport route availability module. The communication system configuration module then adapts the vessel's communication system capabilities and configuration based on the transport route availability.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

The following description describes methods and apparatus for providing transport channel flexibility over satellite backhaul links in vessel to land communication systems. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

To ease understanding, dashed lines have been used in the figures to signify the optional nature of certain items (e.g., features not supported by a given implementation of the invention; features supported by a given implementation, but used in some situations and not in others).

Cellular communication systems can be deployed on transport vessels to support such things as machine-to-machine ("M2M") device tracking/control, voice calls, and general internet access. Utilizing both many satellite backhaul technologies (e.g., FBB, Ku-band VSAT, and Ka-band VSTA) data traffic and be spread across the backhaul technologies creating a cost effective, robust solution that provides maximum global coverage.

Embodiments of the invention provide a system and method for robust and efficient transmissions between a mobile radio base station ("RBS") (i.e. located on moving vessel) and a fixed (land-based) base station controller ("BSC"), utilizing multiple satellite transport technologies. For example, many transport vessels and cruise liners are currently equipped with a Fleet Broad Band type communication system. The proposed solution will add a cellular communications system onboard the vessel along with new VSAT satellite communications equipment.

Data applications running on devices on a vessel generate internet protocol ("IP") packets which are routed to the appropriate satellite transport channel based upon throughput needs, associated transport costs, and satellite link availability. With more than one transport route is available/active the passage of IP packets will be spread between the satellite links considering both data size and transport costs to determine optimal paths for each application. Whenever a satellite link becomes unavailable, all acceptable packets will be transferred to the operational links.

Figure 1:
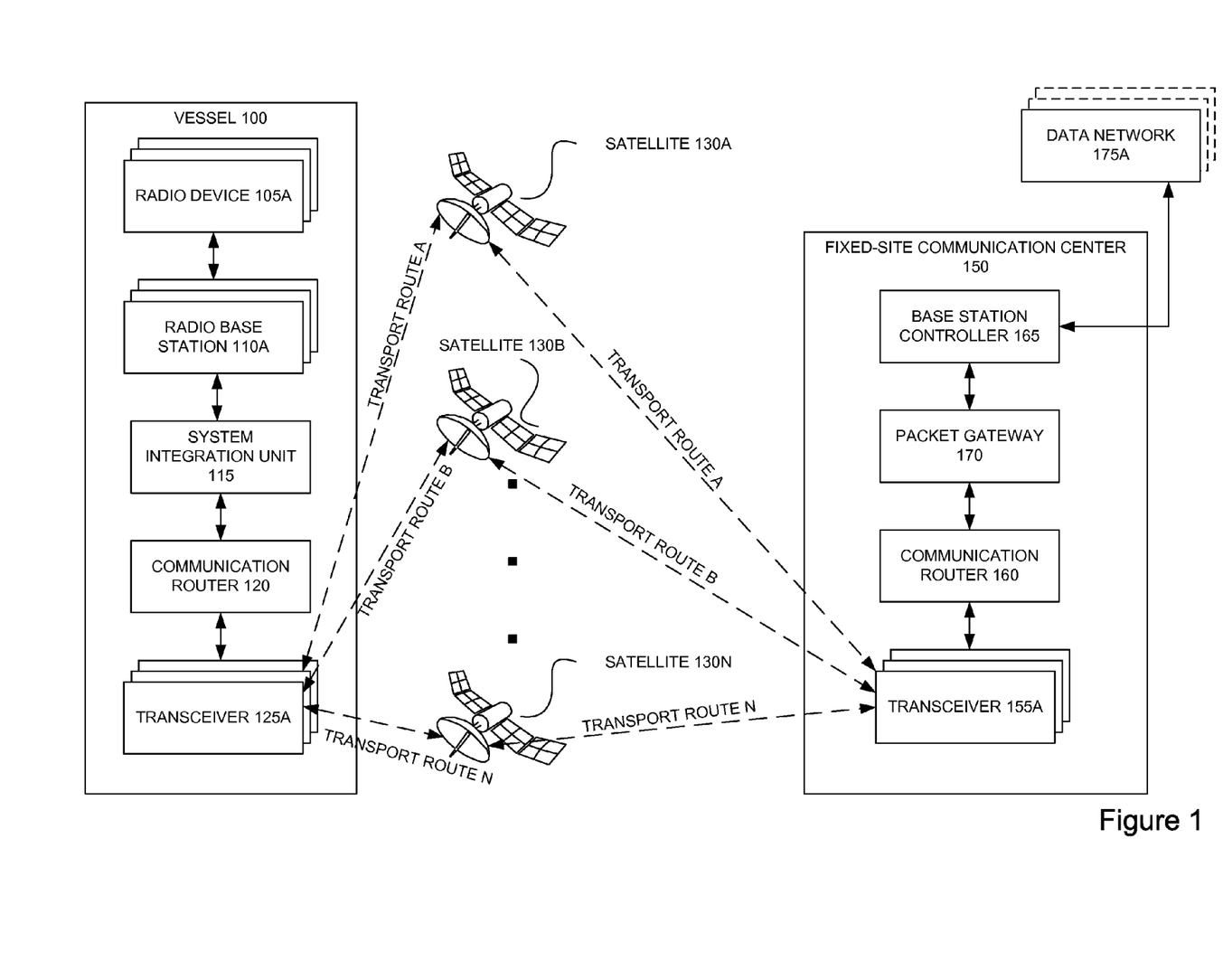
FIG. 1 illustrates a block diagram of elements within a vessel-to-land communication system according to one embodiment of the invention.

FIG. 1 illustrates a block diagram of elements within a vessel-to-land communication system according to one embodiment of the invention. In FIG. 1, a vessel 100 is in communication with a fixed-site communication center 150. The fixed-site communication 150 acts a gateway for communications from the vessel 150 to one or more data networks.

On the vessel 100, a plurality of radio devices 105A are configured to communicate with one or more radio base stations ("RBS") 110A-N. On a vessel, there are many advantages to providing a radio communication system. Such a system allows for a vast array of devices to communicate amongst one another and with land based systems coupled with the vessel. In the shipping industry for example, it is advantageous to equip containers with radio devices. This allows the inventory systems to maintain accurate inventory of which containers are onboard via communication with the radio devices on each container, for example with Short Message System ("SMS") messages. Further, some containers require climate control to maintain temperature and humidity within the container as the goods within are climate sensitive (e.g., requiring refrigeration). A climate control system within the container would is able to communicate with inventory systems or diagnostic systems to report climate status or adjust climate settings via radio communication. Furthermore, the communication system is able to push out configuration settings and software updates to the devices on board the vessel to maintain the radio devices.

The RBSs 110A-N communicates with a system integration unit 115 which is configured to designate packets for transport on one of the plurality of transport routes A-N (i.e. transport channels). The system integration unit 115 is coupled with a communication router 120 that is coupled with a plurality of transceivers 125A-N, each transceiver corresponding to one of the transport routes A-N. As the system integration unit 115 designates a packet for transport on one of the transport routes A-N, the communication router 120 receives the packets and communicates each packet to the transceiver 125A-N associated with the designated transport route A-N.

Each of the transceivers 125A-N implements a satellite backhaul technology (e.g., FBB, Ku-band VSAT, and Ka-band VSTA) and communicates with a corresponding satellite 130A-N. In turn, each satellite 130A-N also communicates with a plurality of transceivers 155A-N located at a fixed-site communication center 150. It should be noted that although illustrated with all of the plurality of transceivers 155A-N located at a single fixed-site communication center 150, other embodiments of the invention may spread the plurality of transceivers 155A-N among a plurality of fixed site communication centers.

The radio base stations allow the vessel to generate a radio data network. In one embodiment, the radio data network comprises a plurality of devices communicating with the Global System for Mobile Communications ("GSM") protocol. In another embodiment, the radio data network comprises a plurality of devices communicating with the Code Division Multiple Access 2000 ("CDMA2000") protocol. In another embodiment, the radio data network comprises a plurality of devices communicating with the General Packet Radio Service ("GPRS") protocol. In another embodiment, the radio data network comprises a plurality of devices communicating with the Enhanced Data Rate for Global System ("EDGE") protocol. In yet another embodiment, the radio data network comprises a wireless local area network with a plurality of devices communicating based on the Institute of Electrical and Electronics Engineers ("IEEE") 802.11 Wireless LAN standard. Other embodiments of the invention may combine radio devices and base stations communicating with different radio protocols such as combination of the protocols mentioned. Still other embodiments may utilize more, less, or different radio communication protocols such as Personal Area Networks (i.e., 802.15), wireless wide area networks (i.e., 802.16-WiMax). A personal skilled in the art would recognize that many suitable radio communication protocols may be utilized on the vessel in embodiments of this invention.

At the fixed-site communication center 150, each transceiver 155A-N is coupled with a communication router 160. As the transceivers 155A-N receive packets from the satellites 130A-B, the packets are forwarded to the communication router 160. The communication router 160 routes each packet to a packet gateway 170. The packet gateway further couples the vessel radio network with a base station controller 165 which is coupled with one or more external data networks 175A-N.

In one embodiment, the base station controller 165 provides intelligence to one or more land based radio base stations (not shown) that enable land based radio communication (e.g., land based cellular access). In another embodiment, the base station controller 165 assists with configuring the radio base stations 110A-N on the vessel 100. In yet another embodiment, the base station controller 165 provides intelligence for configuring/controlling one or more land based radio base stations and the radio base station 110A-N.

Figure 2:
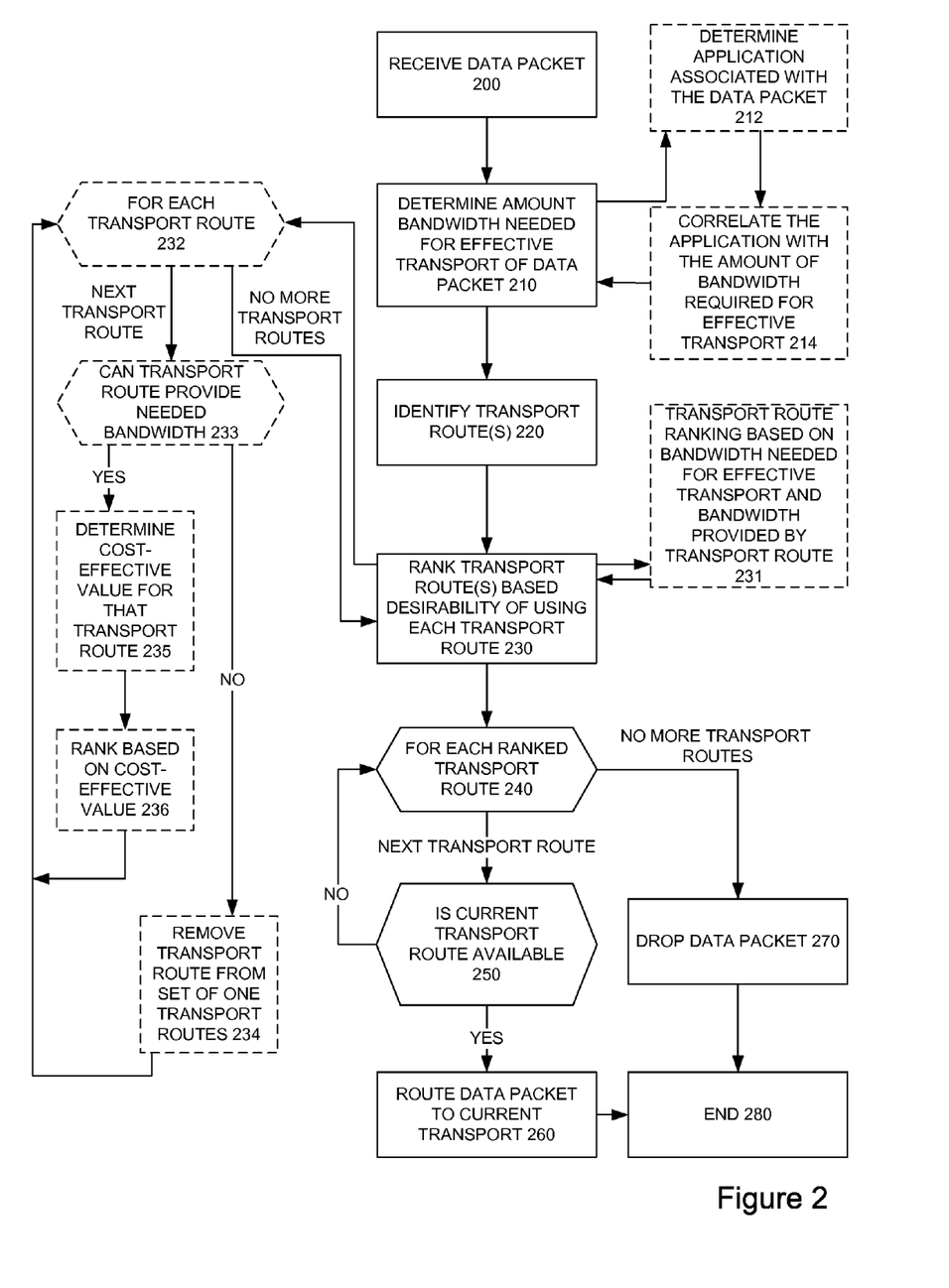
FIG. 2 illustrates a flow diagram of a method performed in a system integration unit for routing packets to one of a plurality of transport routes.

FIG. 2 illustrates a flow diagram of a method performed in a system integration unit for routing packets to one of a plurality of transport routes. In block 210 the system integration unit receives a data packet generated by a device located on a vessel. For example, the system integration unit receives a packet generated by one of the radio devices 105A-N. The system integration unit determines the amount of bandwidth needed for the effective transmission of the data packet in block 210.

In one embodiment, the system integration unit determines an application associated with the data packet in block 212; i.e., an application that generated the data packet or will receive the data packet. For example, the system integration unit inspects the header of the data packet to determine an application which generated that data packet while in another embodiment the system integration unit inspects the payload of the data packet to determine the application which generated that data packet. Then in block 214 the system integration unit correlates the application with amount of bandwidth required for the effective transport of the data packet.

In block 220, the system integration unit identifies a set of one or more transport routes that each corresponds to a satellite transceiver configured on the vessel for transmitting data from the vessel to a fixed-site communication center through a satellite uplink. In block 230, the system integration unit ranks each transport route in the set of one or more transport routes according to the desirability of that transport route for transmitting the data packet. Ranking is done based a number of criteria.

In one embodiment, the system integration unit, in block 231, bases the ranking of the transport routes on the a comparison of the bandwidth needed for the effective transport of the data packet and the amount of bandwidth provided by each transport route. As such a transport route with a larger amount of bandwidth would receive a higher ranking than a transport route with a lower amount of bandwidth.

In another embodiment, the criteria for ranking the transport routes is based on the monetary cost associated with that transport route. As satellite providers often charge based on the size of a communication, a slow link with a lower cost may provide a more cost-effective transport route than a faster link with a higher cost thereby the slow link would be ranked higher than the slow route.

In another embodiment, a combination of the speed of the transport link and the monetary cost associated with that link is utilized to generate the ranking of transport routes. For example, one application may require a higher amount of bandwidth to effectively communicate data packets (e.g. voice over IP, video conferencing, packet switched data traffic) and thereby bandwidth would be weighted more heavily than monetary cost when determining the transport route ranking. Other applications may have little benefit from a faster transmission (e.g. short message service ("SMS"), system signaling between radio base stations and base station controllers, circuit-switched voice traffic) and thus may be serviced adequately from a transport route with a lower bandwidth; as such, the monetary cost would be weighted more than transport route bandwidth when ranking transport routes for data packets from that application.

In yet another embodiment, the system integration unit performs the follow steps when ranking the transport routes. The system integration unit iterates through the list of transport routes in block 232. In block 233 the system integration unit determines whether the transport route can provide the amount of bandwidth needed for the effective transport of the data packet. If the transport route cannot provide the needed bandwidth then the system integration unit removes the transport route from the set of one or more transport routes in block 234 and continues to the iterate over the list in block 232. If the transport route can provide the needed bandwidth then the system integration unit continues at block 235 and determines a cost-effective value for the transport route. Then the system integration unit ranks the transport route based on a comparison of its cost-effective value with the cost-effective value of each of the other transport routes in block 236 and continues to the iterate over the list in block 232. Once the entire list is iterated through the ranking is concluded.

In block 240, the system integration unit iterates over the ranked transport routes, processing the most desirable transport route first and the least desirable transport route last. For each transport route, the system integration unit determines if the transport route is available for the transmission of the data packet at block 250; as described above, a number of external factors affect satellite communication (e.g., weather and signal blockage).

If it is determined that the transport route is available, then system integration unit routes the data packet to that transport route at block 260. In one embodiment, the system integration unit adds information to a header in the data packet indicating which transport route the data packet should take. The system integration unit then forwards the data packet to a communication router which processes the packet according to the information added to the data packet header. In another embodiment, the system integration unit merely forwards the data packet to a transceiver corresponding to the transport route. Once the data packet is routed to the transport route, the system integration is done with that data packet and the method ends in block 280.

If it is determined, in block 250, that the transport route is not available to transport the data packet then the system integration continues iterating through the ranked transport routes so long as another transport route is in the ranked list. If no other transport routes are in the ranked list then the system integration unit drops the data packet in block 270 and the method ends in block 280.

FIG. 2 has been described with reference to traffic travelling from a vessel to a fixed-site communication center. A similar method may be performed by a packet gateway at a fixed-site communication center for packets travelling to a vessel. This allows the packet gateway to adapt communication to the vessel based on transport route availability in a similar manner to the way that the system integration units adapts communication from the vessel to the fixed-site communication unit.

Figure 3:
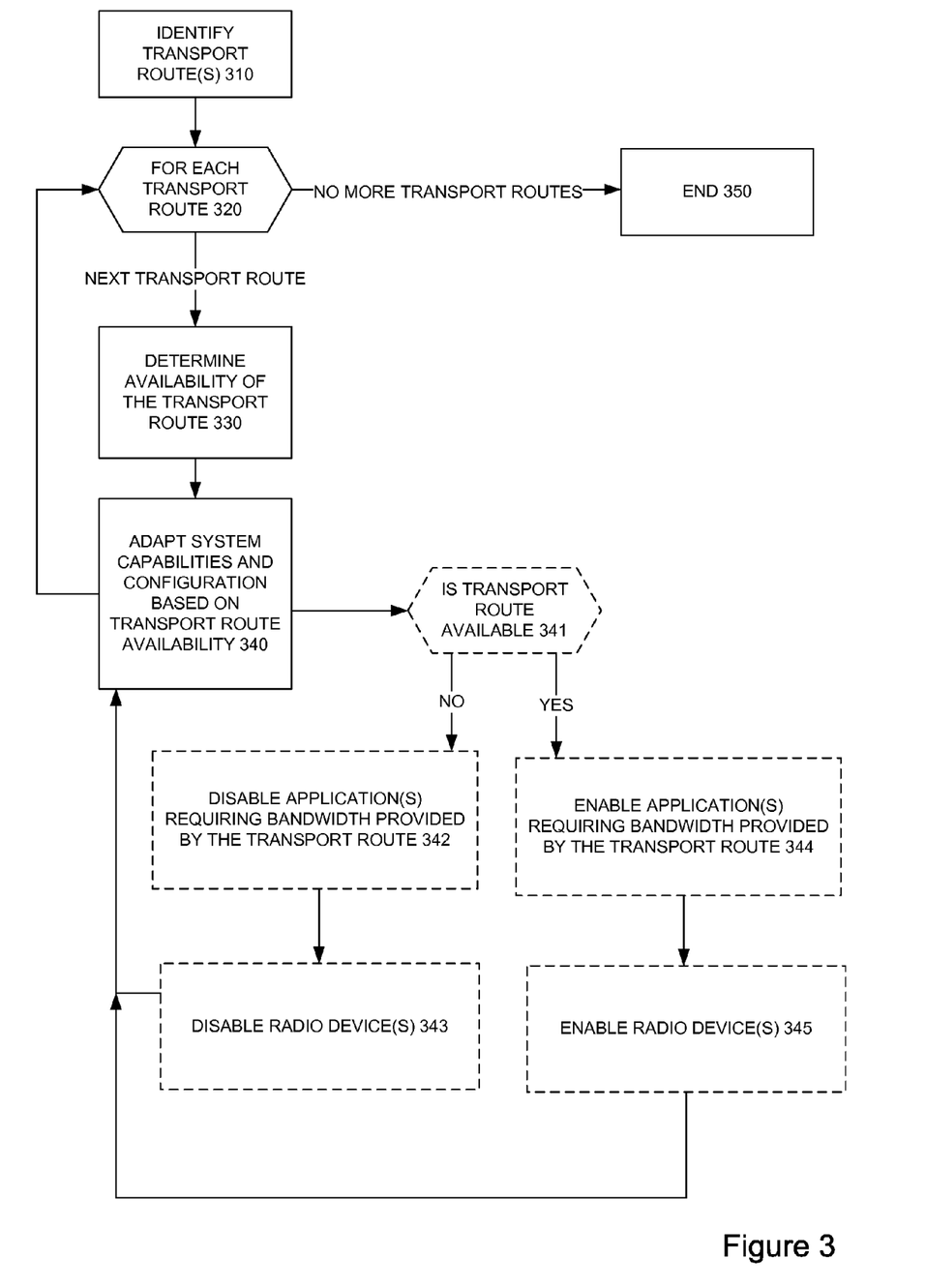
FIG. 3 illustrates a flow diagram of a method performed in a base station controller for adapting a vessel's communication system based on the availability of a plurality of transport routes.

FIG. 3 illustrates a flow diagram of a method performed in a base station controller for adapting a vessel's communication system based on the availability of a plurality of transport routes. In block 310, the base station controller identifies a set of one or more transport routes that each corresponds to a satellite transceiver configured on the vessel for transmitting data from the vessel to a fixed-site communication center through a satellite uplink. In block 220, the base station controller iterates over the ranked transport routes, processing the most desirable transport route first and the least desirable transport route last. For each transport route, the base station controller determines the availability of the transport route for the transmission of the data packet at block 230; as described above, a number of external factors affect satellite communication (e.g., weather and signal blockage) availability.

In block 340, the base station controller adapts the vessel's communication systems capabilities and configuration based on the transport route availability. For example, radio devices can have multiple applications for M2M communication, such device tracking and status reporting via SMS and software updates via packet switched data. Further, some radio devices may not require one hundred percent uptime and, thus, it is not critical for that set of radio devices to maintain communication. As such, the system integration unit may adapt the capabilities and configuration of the communication system by enabling or disabling applications and/or devices.

Thus, in one embodiment, if the transport route is not available in block 341 then the base station controller continues to either block 342 or block 343, or both blocks 342 and 343. In block 342, the base station controller disables one or more applications that require bandwidth provided by the transport route. For example, the base station controller may determine that a higher speed link used to provide software updates is not available, the system integration unit can communicate with the radio devices to disable software updates while allowing a status reporting application or inventory tracking application to continue operating as normal. In block 343, the base station controller disables one or more radio devices. As such, the base station controller may determine that it is not critical for those radio devices to maintain communication and disable the non-critical radio devices because one or more transport routes is not available.

In the reverse, when base station controller determines that the transport route is available in block 341 the system integration unit continues to either block 344 or block 344, or both blocks 344 and 344. In block 342, the base station controller enables one or more applications that require bandwidth provided by the transport route. In block 345, the base station controller enables one or more radio devices.

The base station controller continues at block 320 with iterating to the next transport route. If no more transport routes are in the list then the method ends at block 350.

Figure 4:
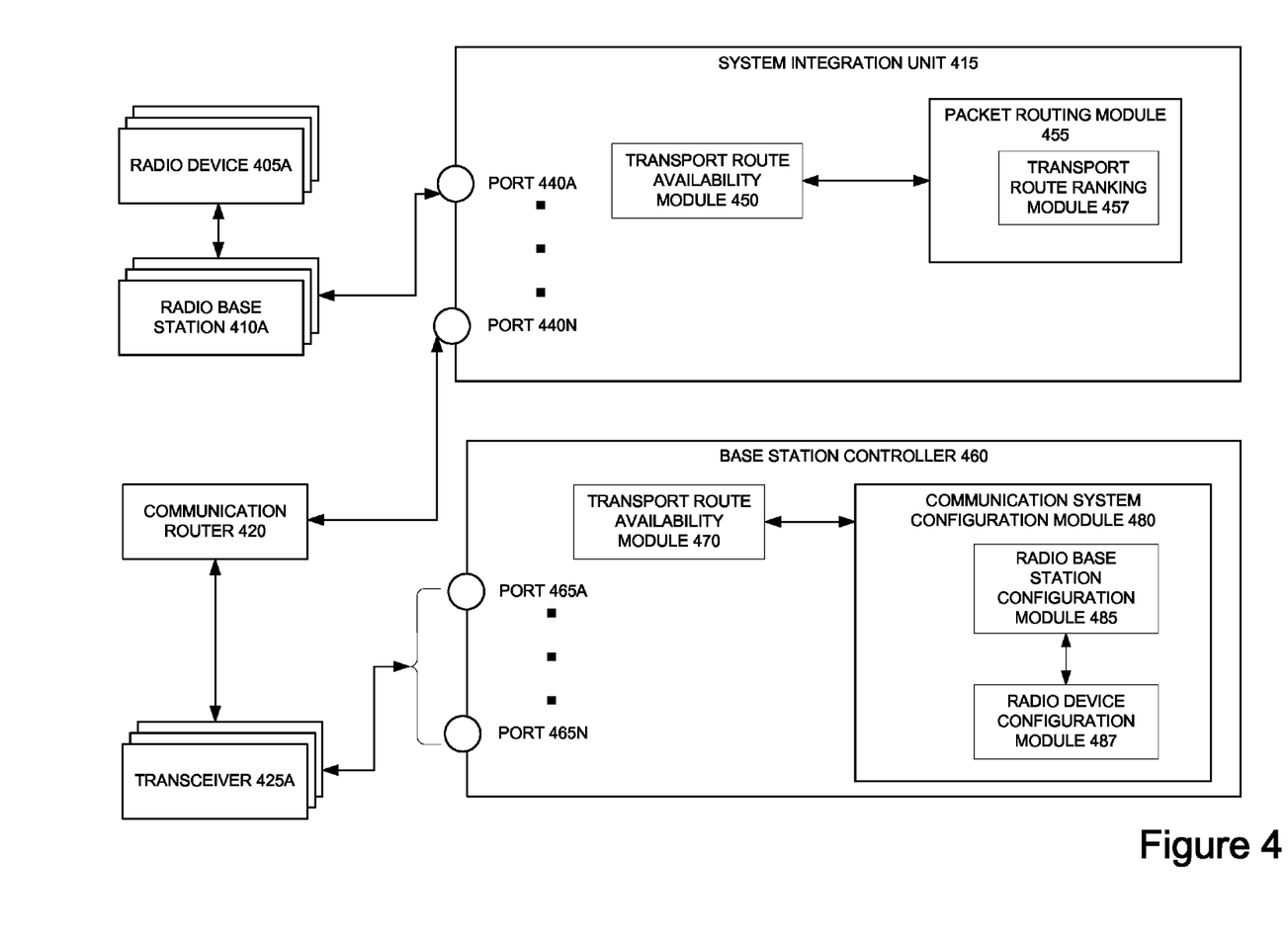
FIG. 4 is a block diagram illustrating components of a vessel radio communication system according to embodiments of the invention.

FIG. 4 is a block diagram illustrating components of a vessel radio communication system according to embodiments of the invention. The radio communication system comprises a plurality of radio devices 405A-N coupled with one or more radio base stations 410A-N. The one or more radio base stations 410A-N are coupled with a system integration unit 415 which routes packets to one or a plurality of transport routes and adapts the capabilities and configuration of the vessel radio communication system based on the availability of the plurality of transport routes. The system integration unit is further coupled with a communication router 420 which is coupled with a plurality of wireless transceivers 425A-N (e.g., satellite transceivers communicating with satellites utilizing a plurality of satellite backhaul technologies).

The system integration unit 415 comprises a plurality of ports 440A-N to be coupled with the radio base stations 410A-N and the communication router 420. Further the system integration unit 415 comprises a transport route availability module 450 and a packet routing module 455. As described above, satellite backhaul links are sensitive to service outage, specifically due to weather conditions and signal blockage. Therefore, the transport route availability module 450 is configured to determine which of the transport routes provided by the transceivers 425A-N are available to communicate data packets by querying each corresponding the transceiver 425A-N of its unlink status. The transport route availability module 450 is coupled with the packet routing module 455.

The packet routing module 455 is configured to determine which of a plurality of transport routes provided by transceivers 425A-N is to be selected for each packet destined to a fixed-site communication center. The packet routing module 455 further comprises a transport route ranking module 457.

The transport route ranking module 457 is configured to rank each transport route based on the desirability of utilizing that transport route for the transmission of a data packet to the fixed-site communication center. As such, the transport route ranking module 457 is configured to inspect a data packet to determine an application which generated said packet and, based on the application, determines an amount of bandwidth required to transport said data packet effectively. Further, the transport route ranking module 457 utilizes knowledge of the amount of bandwidth each transport route can provide and the cost associated with utilizing that transport route to generate a ranked list of desirable transport routes. The packet routing module 455 uses the information about the availability of each transport route from the transport route availability module 450 and the ranked list of desirable transport routes 457 to determine a transport route that should be used for the transmission of the data packet and marks the data packet accordingly before forwarding the packet on to the communication router 420.

and a communication system configuration module 460.
and communication system configuration module 460.

The radio communication system is coupled with a base station controller 460 through the plurality of transport routes provided by the transceivers 425A-N. In FIG. 4, the coupling of the base station controller 460 and the transceivers 425A-N is done through a plurality of transceivers (not shown) at a fixed-site communication center and a plurality of satellites (also not shown). The base station controller 460 comprises a transport route availability module 470 coupled with a communication configuration module 480. The transport route availability module 470 is configured to determine which of the transport routes provided by the transceivers 425A-N are available to communicate data packets.

The communication system configuration module 480 is configured to adapt the vessel's communication systems capabilities and configuration based on the transport route availability. The communication system configuration module 480 uses the information about the availability of each transport route from the transport route availability module 470 and knowledge regarding the communication systems features and bandwidth requirements to enable/disable application and devices within the vessel communication system. The communication system configuration module 480 comprises a radio base station configuration module 485 and a radio device configuration module 487. The radio base station configuration module 485 is configured to issue commands to the radio base stations 410A-N, the command enabling/disabling features provided by the radio base station based on the availability of the plurality of transport routes. The radio device configuration module 487 is configured to issue commands to the radio devices 405A-N, the command enabling/disabling features provided by the radio devices or the enabling/disabling the radio devices 405A-N based on the availability of the plurality of transport routes.

Figure 5:
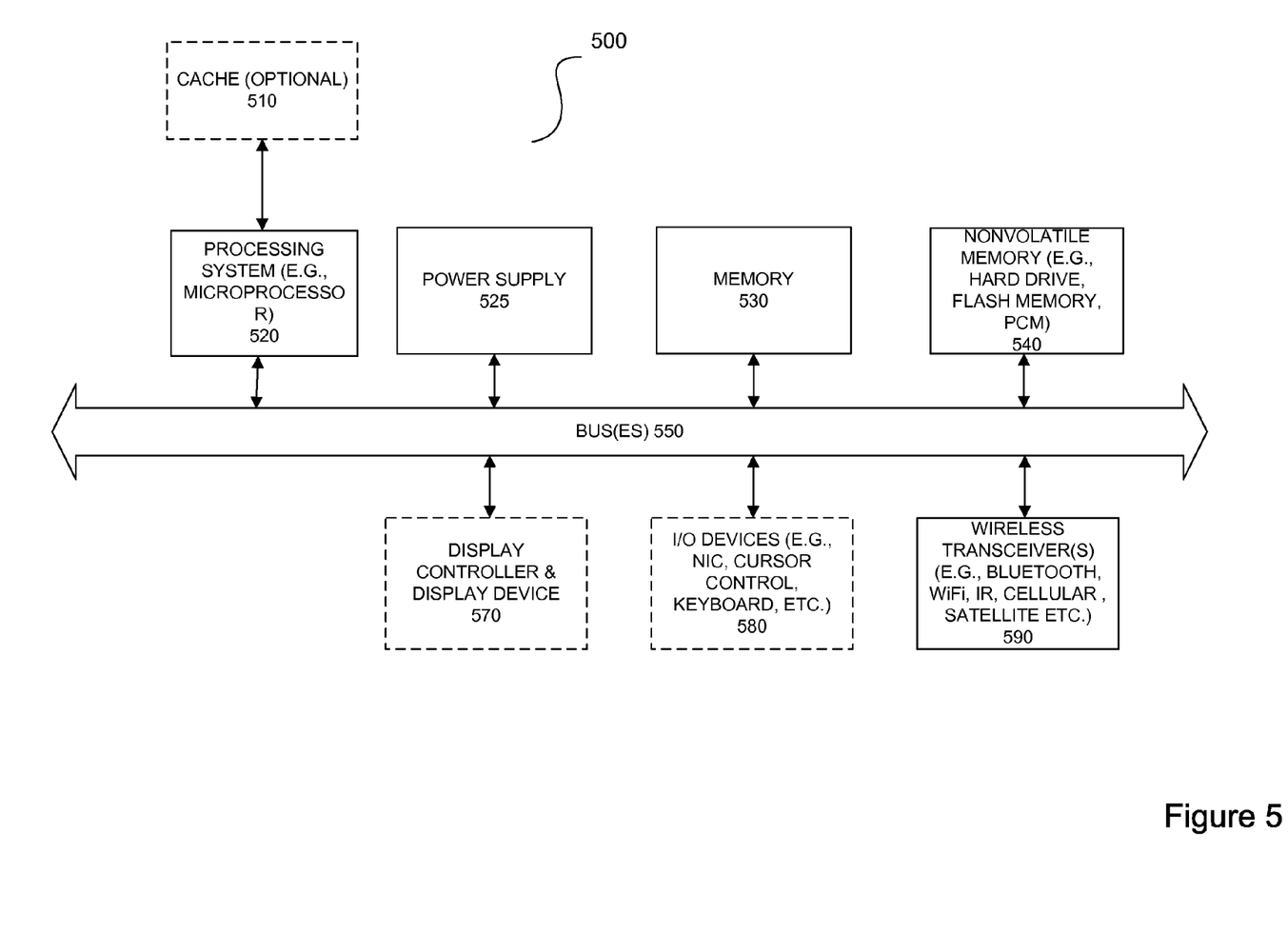
FIG. 5 is a block diagram illustrating an exemplary computer system according to embodiments of the invention.

FIG. 5 is a block diagram illustrating an exemplary computer system according to embodiments of the invention. The exemplary computer system 500 in FIG. 5 can be used to implement system integration units, communication routers, radio devices, radio base stations, base station controllers, transceivers, or packet gateways. Those skilled in the art would recognize that other computer systems used to implement these elements may have more or less components and may be used to in embodiments of the invention.

The computer system 500 includes a bus(es) 550 which is coupled with a processing system 515, a power supply 520, volatile memory 525 (e.g., double data rate random access memory ("DDR-RAM"), single data rate ("SDR") RAM), nonvolatile memory 530 (e.g., hard drive, flash memory, Phase-Change Memory ("PCM"). The processing system 515 may be further coupled to a cache 510. The processing system 515 may retrieve instruction(s) from the volatile memory 525 and/or the nonvolatile memory 530, and execute the instruction to perform operations described above. The bus(es) 550 couples the above components together and further couples a display controller 570, one or more input/output devices 580 (e.g., a network interface card, a cursor control (e.g., a mouse, trackball, touchscreen, touchpad, etc.), a keyboard, etc.), and, optionally, one or more wireless transceivers 590 (e.g., Bluetooth, WiFi, Infrared, cellular, satellite, etc.). In one embodiment, the display controller 570 is further coupled to a display device 575.

The techniques shown in the figures can be implemented using code and data stored and executed on one or more electronic devices. Such electronic devices store and communicate (internally and/or with other electronic devices over a network) code and data using non-transitory tangible machine readable medium (e.g., magnetic disks; optical disks; read only memory; flash memory devices; phase-change memory) and transitory machine-readable communication medium (e.g., electrical, optical, acoustical or other forms of propagated signals-such as carrier waves, infrared signals, digital signals, etc.). In addition, such electronic devices typically include a set or one or more processors coupled with one or more other components, such as a storage device, one or more input/output devices (e.g., keyboard, a touchscreen, and/or a display), and a network connection. The coupling of the set of processors and other components is typically through one or more busses or bridges (also termed bus controllers). The storage device and signals carrying the network traffic respectively represent one or more non-transitory tangible machine readable medium and transitory machine-readable communication medium. Thus, the storage device of a given electronic device typically stores code and/or data for execution on the set of one or more processors of that electronic device. Of course, one or more parts of an embodiment of the invention may be implemented using different combination of software, firmware, and/or hardware. For example, the techniques shown in the figures have been described with reference to a specific entity performing the techniques. One of skill in the art would recognize that in other embodiments other or different entities may perform the same techniques. Further one entities shown as separate may be combined as one entity in other embodiments without changing the fundamental teachings of the techniques.

What is claimed is:

1. A method for routing data packets from a vessel to a fixed communication center through to a transport route, the method performed in a system integration unit located on the vessel and coupled with a radio device and a plurality of satellite transceivers that each provides a transport route for communication, the method comprising the steps of:
   receiving a data packet from the radio device;
   determining an amount of bandwidth required for effective transport of the data packet;
   identifying a set of transport routes, wherein each transport route is provided by one of the plurality of satellite transceivers;
   ranking the transport routes according to desirability of using each of the transport routes for the transport of the data packet;
   performing the following steps on a set of ranked transport routes in an order of ranking of the transport routes:
      determining whether a transport route of the set of ranked transport routes is available to transport the data packet based on a satellite backhaul technology and routing the data packet thereto if the transport route is available;
      and
      dropping the data packet when is determined that no transport route of the set of ranked transport routes is available to transport the data packet.

2. The method of claim 1 wherein at least one criteria used during the ranking is a comparison between the amount of bandwidth required for the effective transport of the data packet and an amount of bandwidth provided by each of the transport routes.

3. The method of claim 1 wherein the step of determining the amount of bandwidth required for effective transport of the data packet further comprises the steps of:

determining an application associated with the data packet; and correlating the application associated with the data packet with the amount of bandwidth required for the effective transport of the data packet.

4. The method of claim 1 wherein the step of ranking the transport routes further comprises performing the following steps for each one of the transport routes:

determining whether the transport route can provide the amount of bandwidth required for the effective transport of the data packet;

in a case that the transport route can provide the amount of bandwidth required for the effective transport of the data packet, performing the following:

determining a cost-effective value for the transport route, ranking the transport route based on the cost-effective value of the transport route in comparison to the cost-effective values of each of the other transport routes; and in a case that the transport route cannot provide the amount of bandwidth required for the effective transport of the data packet, removing the transport route from the set of ranked transport routes.

5. The method of claim 4 wherein the step of determining the cost-effective value is based on a monetary cost and a speed associated with a corresponding transport route.

6. The method of claim 1 wherein the transport routes comprise, at least:

a first transport route utilizing a first satellite backhaul technology; and a second transport route utilizing a second satellite backhaul technology.

7. The method of claim 6, wherein:

the first transport route includes a first wireless connection from a first satellite transceiver on the vessel to a first satellite utilizing the first satellite backhaul technology; and the second transport route includes a second wireless connection from a second satellite transceiver on the vessel to a second satellite utilizing the second satellite backhaul technology.

8. The method of claim 7, wherein the first satellite backhaul technology is a fleet broadband communication technology and the second satellite backhaul technology is a very small aperture terminal communication technology.

9. A method for configuring a communication system on a vessel communicating with a fixed communication center through transport routes, the method performed in a system integration unit located on the vessel and coupled with a radio device and a plurality of satellite transceivers that each provides a transport route for communication, the method comprising the steps of:

identifying a set of transport routes for transport of a data packet received from the radio device, wherein each transport route is provided by one of the plurality of satellite transceivers; and performing the following steps on the set of transport routes:

determining availability of a transport route of the set transport routes based on an amount of bandwidth required for effective transport of the data packet and a satellite backhaul technology, adapting communication system capabilities and configuration based on the availability of the transport route including disabling transmission of a data packet associated with a set of one or more applications because the amount of bandwidth therefor is unavailable, and disabling the radio device when the transport route is unavailable.

10. The method of claim 9 wherein the set of one or more applications includes at least one of an application that is accessing Internet web data, accessing video conferencing data, accessing Voice Over Internet Protocol data, or accessing firmware update data for the radio device.

11. A system integration unit to operate in a vessel communication system on a vessel, the system integration unit to be coupled to a radio device, a radio base station, a router, and a plurality satellite transceivers that each provides a transport route, the system integration unit configured to manage the vessel communication system and comprising:

a plurality of ports to be coupled to the radio base station and the plurality of satellite transceivers;

a transport availability module operable on a processor of the system integration unit configured to determine whether each of a plurality of transport routes is available to transport a data packet, wherein each transport route is provided by one of the plurality of satellite transceivers; and a packet routing module operable on the processor, coupled with the transport route availability module and configured to:

receive the data packet from the radio device, determine an amount of bandwidth required for effective transport of the data packet, identify a set of transport routes, rank the transport routes according to desirability of using each of the one or transport routes for the transport of the data packet, perform the following steps on a set of ranked transport routes in an order of ranking of the transport routes:

determine availability of a transport route of the set of ranked transport routes from the transport availability module based on a satellite backhaul technology and route the data packet thereto if the transport route is available; and drop the data packet when it is determined that no transport route of the set of ranked transport routes is available to transport the data packet.

12. The system integration unit of claim 11 wherein at least one criteria used during the ranking is a comparison between the amount of bandwidth required for the effective transport of the data packet and an amount of bandwidth provided by each of the transport routes.

13. The system integration unit of claim 11 wherein the packet routing module is further configured to:

determine an application associated with the data packet; and correlate the application associated with the data packet with the amount of bandwidth required for effective transport of the data packet.

14. The system integration unit of claim 11 wherein the packet routing module, when ranking the transport routes, is further configured to:

determine whether the transport route can provide the amount of bandwidth required for the effective transport of the data packet;

in a case that the transport route can provide the amount of bandwidth required for the effective transport of the data packet, performing the following steps:

determine a cost-effective value for the transport route, rank the transport route based on the cost-effective value of the transport route in comparison to the cost-effective values of each of the other transport routes; and in a case that the transport route cannot provide the amount of bandwidth required for the effective transport of the data packet, remove the transport route from the set of ranked transport routes.

15. The system integration unit of claim 14 wherein the cost-effective value is based on a monetary cost and a speed associated with a corresponding transport route.

16. The system integration unit of claim 11 wherein the transport routes comprise, at least:
   a first transport route utilizing a first satellite backhaul technology; and
   a second transport route utilizing a second satellite backhaul technology.

17. The system integration unit of claim 16, wherein:
the first transport route includes a first wireless connection from a first satellite transceiver on the vessel to a first satellite utilizing the first satellite backhaul technology; and
the second transport route includes a second wireless connection from a second satellite transceiver on the vessel to a second satellite utilizing the second satellite backhaul technology.

18. The system integration unit of claim 17, wherein the first satellite backhaul technology is a fleet broadband communication technology and the second satellite backhaul technology is a very small aperture terminal communication technology.

19. A base station controller to operate in a fixed-site communication center, the base station controller to be coupled with a plurality satellite transceivers that each provides a transport route to a vessel comprising a radio device, a radio base station, a router, and a system integration unit configured to manage a communication system, the base station controller comprising:
   a plurality of ports to be coupled with the plurality of satellite transceivers;
   a transport availability module operable on a processor of the base station controller configured to determine whether each of a plurality of transport routes is available for transporting of data packets, wherein each transport route is provided by one of the plurality of satellite transceivers; and
   a communication system configuration module operable on the processor configured to perform the following:
      identify a set of transport routes for transport of a data packet received from the radio device, and
      perform the following steps on the set of transport routes:
         determine availability of a transport route of the set transport routes based on an amount of bandwidth required for effective transport of the data packet from the transport availability module and a satellite backhaul technology,
         adapt communication system capabilities and configuration based on the availability of the transport route including disable transmission of a data packet associated with one or more applications communicating with the radio device because the amount of bandwidth therefor is unavailable, and
         disable the radio device when the transport route is unavailable.

20. The base station controller of claim 19 wherein the communication system configuration unit is configured to:
   enable the one or more applications communicating with the radio device because the amount of bandwidth therefor is available.

21. The base station controller of claim 20 wherein the one or more applications include at least one of an application that is accessing Internet web data, accessing video conferencing data, accessing Voice Over Internet Protocol data, or accessing firmware update data for the radio device.

22. The base station controller of claim 19 wherein the communication system configuration unit is configured to:
   enable the radio device on the vessel when the transport route is available.

* * * * *